March 12, 1963 R. N. BURCKHALTER 3,080,973
SHUNT TYPE FILTER
Filed March 25, 1960 3 Sheets-Sheet 1
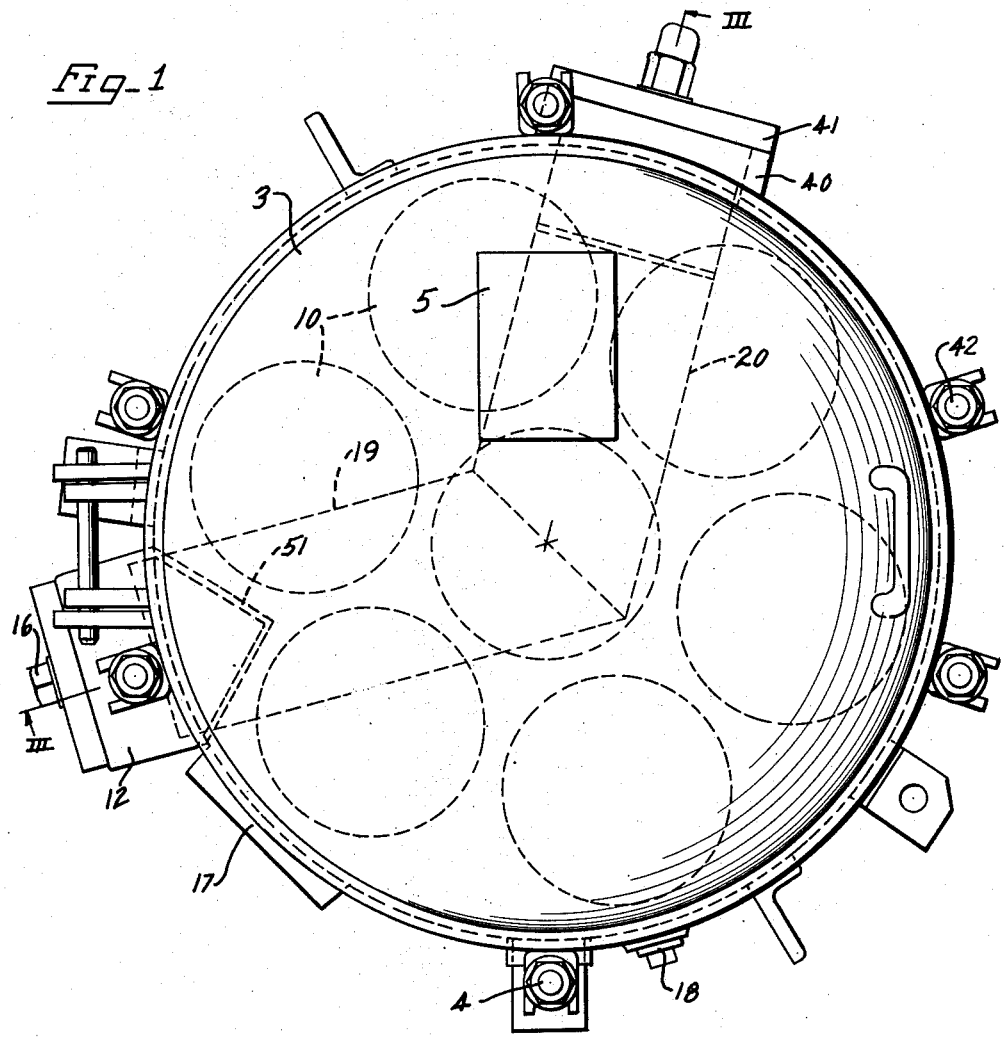
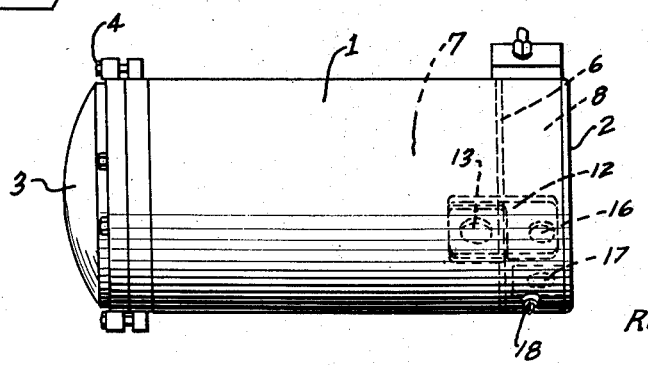
Inventor
Robert N. Burckhalter

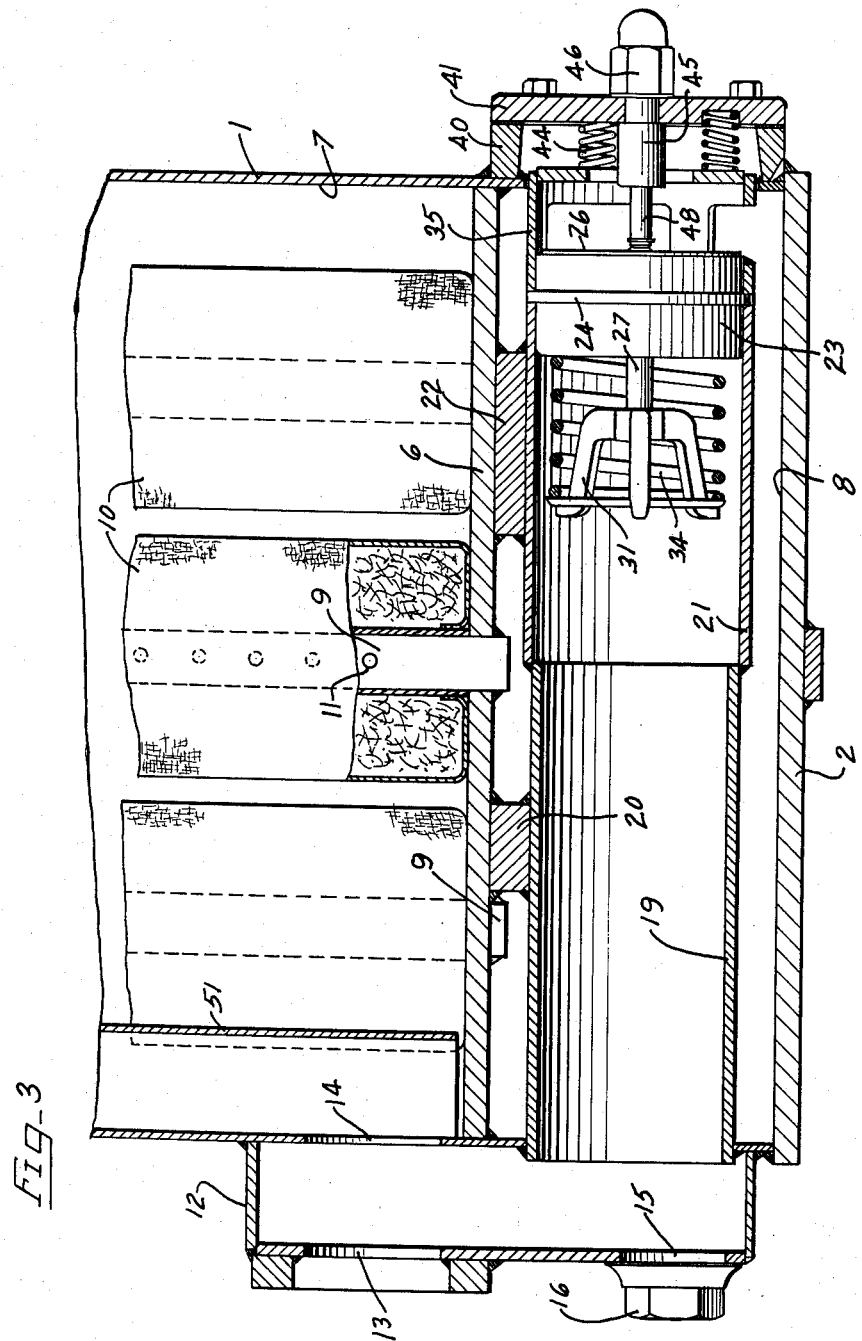

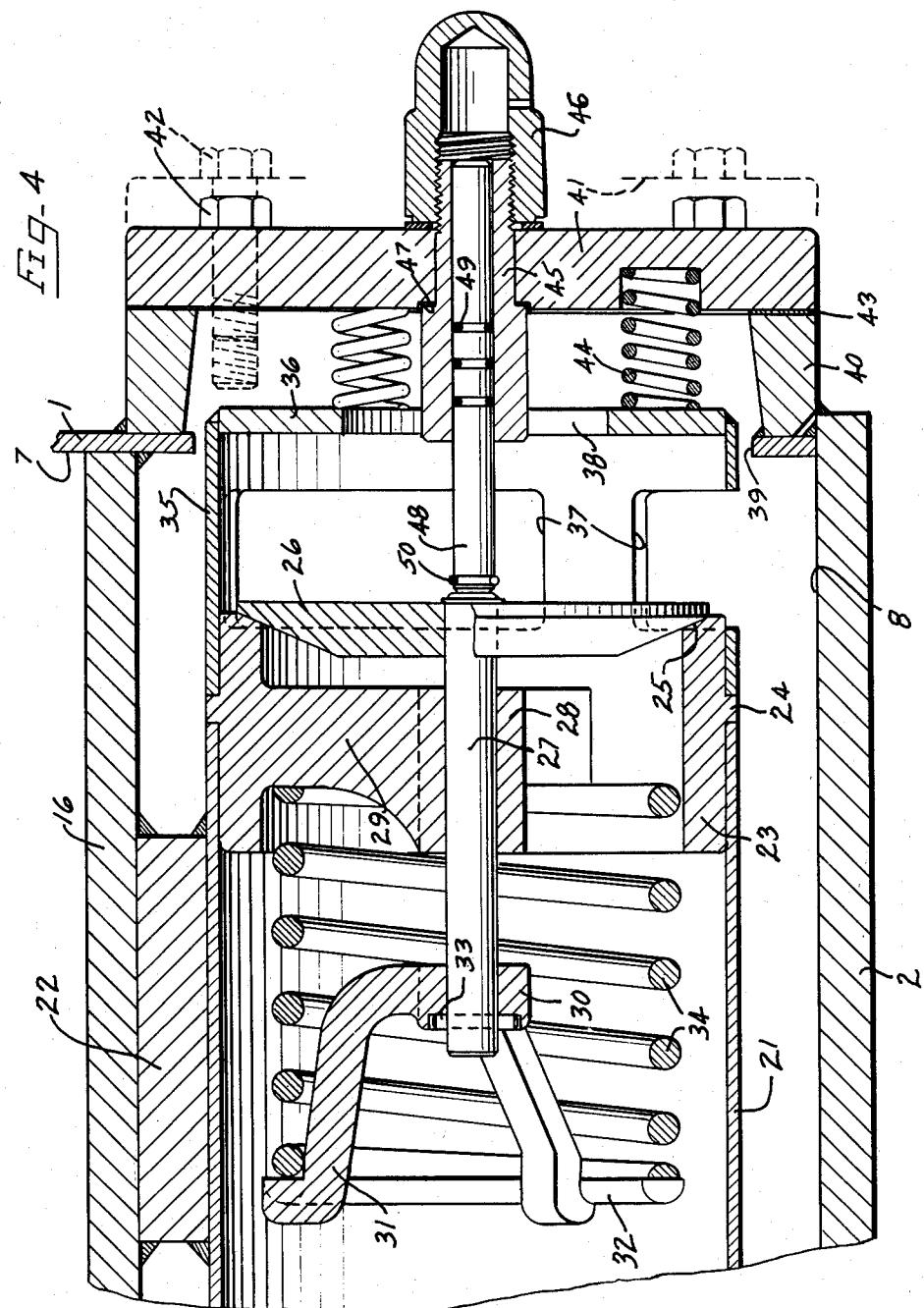

3,080,973
SHUNT TYPE FILTER
Robert N. Burckhalter, Michigan City, Ind., assignor, by mesne assignments, to Commercial Filters Corporation, Melrose, Mass., a corporation of New York
Filed Mar. 25, 1960, Ser. No. 17,588
3 Claims. (Cl. 210—90)

This invention relates to improvements in a shunt type filter, and more particularly to a shunt type filter which may be made in various sizes for various capacities, and which is highly desirable for use in the filtering of lubricating oils, fuel oils, and various other liquids in various locations and with various types of equipment, all as will be apparent to one skilled in the art.

While the instant invention may be used with substantially any type of equipment or machinery requiring a supply of lubricating or fuel oil, it is highly desirable for use in connection with filtering of lubricating oil for railway diesel engines.

In the past many and various types of shunt filters, i.e. a filter wherein a portion of the total oil is passed through the filtering means while the other portion is by-passed therearound, have been developed. In many cases such shunt type filters employed a number of by-pass or relief valves located in the filtering chamber, or in or adjacent to the partition separating the filter chamber from the filtrate chamber, and were objectionable in that the oil being by-passed would contact the surfaces of the filter elements themselves while traveling under pressure and thus wash down accumulated contaminants and carry them along with both the by-passed oil and the filtered oil back to the engine or other machinery. The use of a number of by-pass valves also added objectionably to the cost of the filter. In some instances, the relief valves in shunt filters heretofore made were disposed directly opposite the oil inlet opening where they were subjected to a terrific blast upon the start of operations with an empty filter tank, thus necessitating frequent repairs or replacements of the valves.

Also, filters of this type heretofore made were in many cases so constructed that it would be impossible to mount them in the compact space allotted within a diesel locomotive and still provide access to various parts of the filter. In addition, it may be mentioned that shunt type filters previously made were objectionable in many cases because the by-pass or relief valves could not be checked or inspected as to their operation while the filter was in use, these valves could not be removed and replaced expeditiously and without taking apart other portions of the filter, the relief valves were not positively limited as to movement in an open direction, and the division between filtered oil and by-passed oil occurred well within the casing.

With the foregoing in mind, it is an important object of the instant invention to provide a shunt type filter so constructed that it may be mounted in an extremely limited space with ready access to all removable elements and connections from one side or an end of the structure, whereby the filter is highly adaptable for use with a railway diesel engine.

Another object of the invention is the provision of a shunt type filter, wherein the relief valve or by-pass valve is located in the filtrate compartment and by-passed oil does not come into contact with the filter elements themselves.

Another feature of the instant invention resides in the provision of a shunt type filter, wherein the filter elements and the by-pass or relief valves are fully protected from an initial blast of incoming contaminated liquid, particularly at the start of an operation with an empty filter tank.

Another feature of the invention is the provision of a shunt type filter having but a single by-pass valve of improved construction and which may readily be removed and installed in the casing by the simple removal and replacement of a valve cover, without disturbing other connections or removing other parts of the structure.

It is also an object of this invention to provide a shunt type filter wherein the by-pass valve may be inspected as to its operation from outside the filter casing and while the filter is in operation.

It is also a desideratum of this invention to provide a shunt type filter having a manifold inlet arrangement on the outside of the filter casing, whereby oil to be filtered and oil to be by-passed are separated just prior to entering the main filter casing.

While some of the more salient features, characteristics and advantages of the instant invention have been above pointed out, others will become apparent from the following disclosures, taken in conjunction with the accompanying drawings, in which FIGURE 1 is an end view of a shunt type filter embodying principles of the instant invention;

FIGURE 2 is a reduced side elevational view of the filter taken from the righthand side of FIG. 1;

FIGURE 3 is an enlarged fragmentary distorted vertical sectional view taken substantially as indicated by the angled section line III—III of FIG. 1, looking in the direction of the arrows, and showing the filter in upright position for purposes of clarity; and FIGURE 4 is a fragmentary enlargement of the lower righthand portion of FIG. 3.

As shown on the drawings:

The instant invention may be utilized in substantially any position, upright, horizontal, or at an inclination as may be deemed most desirable for a particular installation. In many cases the filter will be disposed upright, but in the case of a railway diesel engine, the filter will be more often disposed in a horizontal position, as shown in FIG. 2. The operation and functioning of the filter is the same regardless of the position of installation.

In the illustrated embodiment of the invention, portions of the structure that are intended to remain permanently connected are preferably welded as illustrated in the drawings to provide a strong and durable casing structure, although other satisfactory means of connection might possibly be utilized. Specific reference to these various connections will therefore not be made hereafter in every instance.

The embodiment of the instant invention selected for illustrative purposes, with particular reference to FIGS. 1, 2 and 3, includes a casing 1 having a closure 2 at one end thereof which, for purposes of convenience, will be referred to herein as a bottom. At the other end thereof, the casing is closed by a removable cover 3 held in position by a plurality of swing bolt and lug assemblies 4. If desired, the cover may be provided with a removable plate diagrammatically indicated at 5 in FIG. 1 covering an inspection opening. Suitable handles, mounting brackets, and the like may be attached to the exterior of the casing and cover wherever deemed necessary or useful.

Inside thereof, the casing is provided with a transverse partition or false bottom 6 spaced a short distance from the true bottom 2 which divides the casing interiorly into a relatively large filtering chamber 7 and a filtrate chamber 8 of lesser size between the false bottom 6 and the true bottom 2. Secured to the false bottom 6 and extending therethrough at their lower ends are a plurality of pipes or center tubes 9 around each of which any suitable form of filter cartridge 10 may be disposed and held in position by any satisfactory means, not illustrated in the drawings. Each of these center tubes 9 may be perforated therealong as indicated at 11 in FIG. 3 so that liquid being filtered will pass laterally or radially through the cartridges 10 and the filtrate will exit through the respective center tube 9 into the filtrate compartment 8. The filter cartridges may be removed and replaced by taking off the casing cover 3 in a well known manner. In the illustrated instance, seven filter cartridges are shown, and of course there would be seven corresponding center tubes 9, but it will be understood that the number of center tubes and cartridges utilized is dependent upon the desired size and capacity of the particular filter.

An inlet manifold 12 is provided on the casing wall near the bottom end of the casing, this manifold having an inlet port 13 for incoming liquid, and the casing wall itself is provided with an inlet opening 14 substantially opposite the port 13. At the bottom of the manifold is a drain opening 15 closed by a removable plug 16. As seen best in FIGS. 1 and 2, the casing is also provided with an outlet port 17, adjacent the inlet manifold, and this outlet port carries both filtered and by-passed oil from the filtrate compartment or chamber 8. A suitable drain opening is also provided for this filtrate chamber which may be kept closed by a removable plug 18 seen in FIG. 2.

As is evident from the showing in FIG. 3, the by-pass valve assembly is located entirely within the filtrate chamber 8. This assembly includes an intake pipe 19 held in position by a suitable support 20, and having one end projected through the casing fall into communication with the interior of the inlet manifold 12. Another pipe 21, carried by a suitable support 22 from the false bottom 6, has one end welded to the inner end of the pipe 19. However, from the showing in FIG. 1 particularly, it will be noted that the pipe 21 is preferably disposed in angular relationship with the pipe 19, and this angular relationship may be varied as desired at the time the filter is constructed in order to meet installation conditions. The angularity between the pipes 19 and 21 is an important feature of the instant invention, as will more fully later appear herein.

Now with reference more particularly to FIG. 4, it will be seen that the by-pass valve mechanism is carried via the pipe 21. This valve mechanism includes a valve housing 23 cylindrical in shape and provided with an outstanding annular rib 24, the valve housing being of such size as to intimately yet freely telescope within the pipe 21 until the rib 24 abuts the end of the pipe. The outer end of the housing 23 is shaped to provide a seat 25 for a poppet valve 26 carried on a valve stem 27 slidable within a hub 28 on a spider 29 integral with the valve housing. The inner end of the valve stem 27 passes through a hub 30 carried by a cup-shaped spider 31 having an annular spring engaging ring 32 on the inner end thereof. A pin 33 through the inner end of the valve stem maintains these parts in operative relationship. Between the ring 32 and the spider 29 of the valve housing is a coiled spring 34 tending to maintain the valve 26 in closed position. Opening movement of the valve is positively limited by contact of the hub 30 with the hub 28, so that it is impossible for the valve to be opened to an injurious or objectionable extent even by an extreme and unexpected pressure surge.

It will be noted that the valve housing does not enclose the entire valve structure as is the case with most by-pass valves heretofore known, and the instant structure is not only simple, easy of access, but also economical.

To hold the valve housing in position within the pipe 21, a cage comprising a cylindrical portion 35 and an end member 36 is provided. The cylindrical portion 35 of the cage is of a size to intimately yet freely telescope over the outer portion of the valve housing and abut against the aforesaid annular rib 24. This cage is provided with large openings 37 in the cylindrical part thereof and an opening 38 in the end wall 36. An opening 39 is provided in the casing wall 1, which is of sufficient size to permit the entire valve structure to pass therethrough.

Secured to the exterior side of the casing 1 around this opening is a centrally apertured collar 40 which is preferably substantially square in shape. This collar is closed by a complementally shaped cover 41 held in place by bolts 42 engaged in the wider corner portions of the collar outside the opening therethrough, a suitable sealing gasket 43 being disposed between these members. Between the cover 41 and the cage end plate 36 is a plurality of compression springs 44 which spring load the cage 35—36 and forcibly hold this cage against the rib 24 on the valve housing. The cover 41 is easily removable by manipulation of the bolts 42, and when the cover moves outwardly to the dotted line position seen in FIG. 4, the springs 44 are not compressed, so there is no danger of the cover being through off against the operator.

In order to permit inspection of the operativeness of the valve during operation of the filter, particularly to ascertain whether the valve is stuck in either open or closed position, a sleeve bearing 45 is passed through the cover 41. This bearing has a threaded outer end engaged by a hollow cap nut 46, the sleeve being shouldered as at 47 to anchor against the inside of the cover. Obviously, suitable sealing means or gaskets are employed where necessary to prevent leakage in this arrangement. Slidable within the sleeve bearing 45 is an indicating rod 48 provided with sealing means as indicated at 49, and having a snap ring or the equivalent 50 on its inner end to prevent removal of the rod outwardly through the sleeve 45. It should be noted that the inner end of the rod 48 abuts the valve stem 27 where it projects through the valve 26 but is not secured to the valve stem. Such arrangement eliminates all difficult problems of alignment since it makes no difference whether the rod 48 is slightly out of true axial alignment with the valve stem 27 or not.

It is a simple expedient for an operator to remove the cap 46 and ascertain the condition of the valve 26 by means of the rod 48 while the filter continues in operation. The rod will be outwardly extending if the valve is functioning properly, and the operator may press his thumb against the rod to ascertain the condition of the valve. If the rod is in its outermost position and cannot be pushed inwardly, the valve is stuck in open position, and if the rod can be pressed inwardly the full extent illustrated in FIG. 4, the valve is stuck in closed position and requires attention. If the rod is in its outermost position but can be pushed partially inwardly, the valve is functioning properly. During operation it is expected that the valve 26 is open all the time, but not the full limit of its travel. During such inspection the operator is protected against an unexpected pressure surge forcing the indicating rod 48 towards him by the snap ring 50 limiting the outward movement of this rod.

In operation, the present invention is extremely simple, safe, and efficient. Oil or other liquid to be filtered is admitted through the port 13 to the inlet manifold 12 under pressure. Some of this incoming oil will pass through the port 14 in the casing 1, but is prevented from forcefully contacting adjacent filter cartridges by a V-shaped baffle 51 extending partially up within the casing. The remainder of the incoming liquid will enter the pipe 19 but is prevented from striking directly against the by-pass valve, and this is important especially at the start of an operation with an empty filter casing, by means of the sharp angle at the bottom of the intake manifold and also by means of the angularity between the intake pipe 19 and the valve holding pipe 21. The angularity between the pipes 19 and 21 also provides another definite advantage in that the cover 41 and inspection cap 46 may be located in a readily accessible position regardless of the limited space in which the filter must be mounted.

It will also be noted that the incoming liquid is divided into the portion to be filtered and the portion to be by-passed exteriorly of the casing wall inside the manifold and the portion to be by-passed can never enter into the filter chamber 7 and wash contaminants off the surfaces of the filter cartridges and carry those contaminants into the outgoing liquid. Filtered oil will descend through the center tubes 9 into the filtrate compartment 8 and commingle with liquid bypassed by the valve 26 and discharge through the outlet 17. The operation is continuous and the valve 26 remains partially open at all times during operation.

The by-pass valve is simple and positive in operation and fast acting because of its unique reverse construction, the valve itself not coming into contact with the closing spring 34 at any time, and the incoming liquid contacts the valve itself and pushes it away from the spring. The hub 30 coming into contact with the hub 28 limits the outward movement of the valve so as to avoid any injury thereto should unexpected pressure surges occur.

When it is desired to inspect the valve, it is a simple expedient to remove the cap nut 46 and check the movement of the indicating rod 48 without any necessity for stopping operation. Should the valve need attention, it is a simple expedient to cut off incoming oil, remove the cover 41 and withdraw the entire valve mechanism through the opening 39. This mechanism may then be checked and as easily pushed back into position and the cover reapplied. During this operation, particularly if the filter is disposed in horizontal position, it is not necessary to drain either compartment while removing and replacing the valve, because the flexibility of the structure permits the valve to be located in a high easily accessible position as is apparent from the showing in FIG. 2.

From the foregoing, it is apparent that I have provided a highly efficient filter construction possessing such flexibility in manufacture that it may be installed even under most difficult positions and under most limited space, with all connections and manipulatable parts readily accessible. The filter is extremely durable, efficient, and any parts that may become out of order can readily be checked without stopping operation, and if repairs or adjustments are necessary requiring operation to cease, the adjustments can be made with great facility and expeditiously, limiting shutdown time to a minimum.

It will be understood that modifications and variations may be effected without departing from the scope of the novel concepts of the present invention.

I claim as my invention:

1. In a shunt type filter including a casing with a partition interiorly dividing the same into a filtering chamber and a filtrate chamber with a port through the partition covered by filter means in the filtering chamber, said casing having an inlet port into each chamber from a common source of fluid and a single outlet from the filtrate chamber, an angled open pipe in the filtrate chamber with one end operatively connected with the inlet to this chamber, a by-pass valve in the portion of said pipe inwardly of the apex of the angle, a valve operation indicating rod separate from said value with one end positioned to abuttingly contact said valve and the other end projecting through the casing wall, and a cap nut enclosing said projecting end whereby the operation of said valve may be checked without stopping operation of the filter.

2. In a shunt type filter including a casing with a partition interiorly dividing the same into a filtering chamber and a filtrate chamber with a port through the partition covered by filter means in the filtering chamber, said casing having an inlet port into each chamber from a common source of fluid and a single outlet from the filtrate chamber, open pipe means in said filtrate chamber and embodying two joined portions at an angle to each other, the free end of one portion being operatively connected with the inlet to the filtrate chamber, a by-pass valve assembly including a valve casing having an annular outstanding rib thereon freely telescoped into the free end of the other portion with the rib in abutment with the end of the pipe, a cage telescoped over said valve casing into abutment with the other side of said rib, said casing having an opening therein in line with said valve assembly of sufficient size for the assembly to pass therethrough, a cover removably secured to said casing over said opening, and resilient means between said cover and said cage biasing said cage inwardly against said rib.

3. In a shunt type filter including a casing with a partition interiorly dividing the same into a filtering chamber and a filtrate chamber with a port through the partition covered by filter means in the filtering chamber, said casing having an inlet port into each chamber from a common source of fluid and a single outlet from the filtrate chamber, open pipe means in said filtrate chamber and embodying two joined portions at an angle to each other, the free end of one portion being operatively connected with the inlet to the filtrate chamber, a by-pass valve assembly including a valve casing having an annular outstanding rib thereon freely telescoped into the free end of the other portion with the rib in abutment with the end of the pipe, a cage telescoped over said valve casing into abutment with the other side of said rib, said casing having an opening therein in line with said valve assembly of sufficient size for the assembly to pass therethrough, a cover removably secured to said casing over said opening, resilient means between said cover and said cage biasing said cage inwardly against said rib, said cover having an aperture therein, a sleeve in said aperture with a threaded end projecting through the cover, an indicating rod slidable in said sleeve for end abutment with the valve of said assembly and extending within said threaded end, and a cap nut over said threaded end of the sleeve.

References Cited in the file of this patent

UNITED STATES PATENTS

| | | |
|---|---|---|
| 2,401,039 | Bauer | May 28, 1946 |
| 2,473,727 | Robertson | June 21, 1949 |
| 2,528,791 | Scoville | Nov. 7, 1950 |

FOREIGN PATENTS

| | | |
|---|---|---|
| 640,151 | Great Britain | July 12, 1950 |